Oct. 13, 1936.   K. A. WEBER   2,057,174
GLASS GRINDING MACHINE
Filed Nov. 6, 1934   2 Sheets-Sheet 1
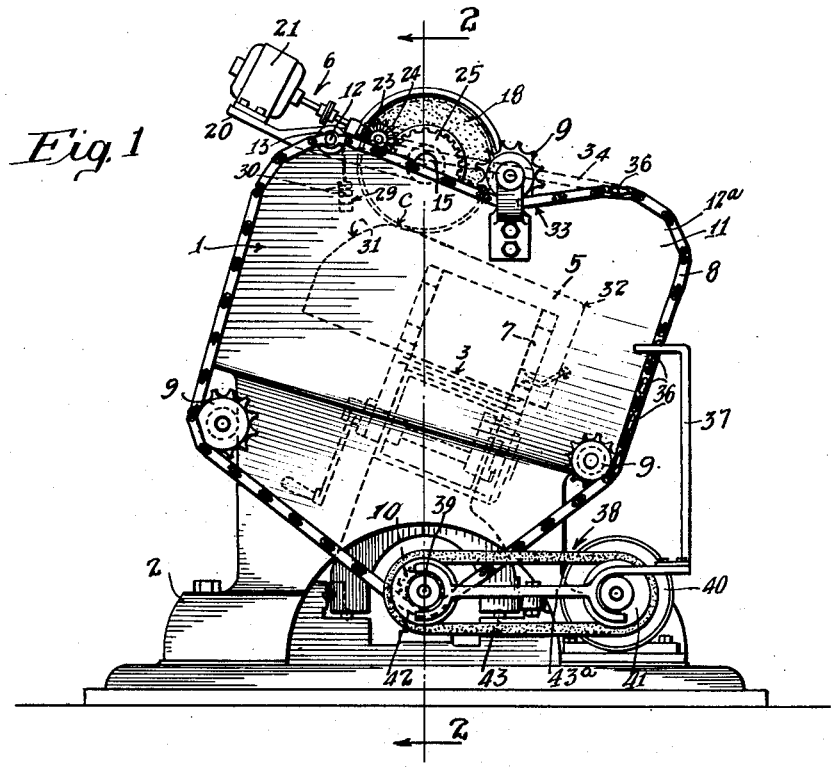
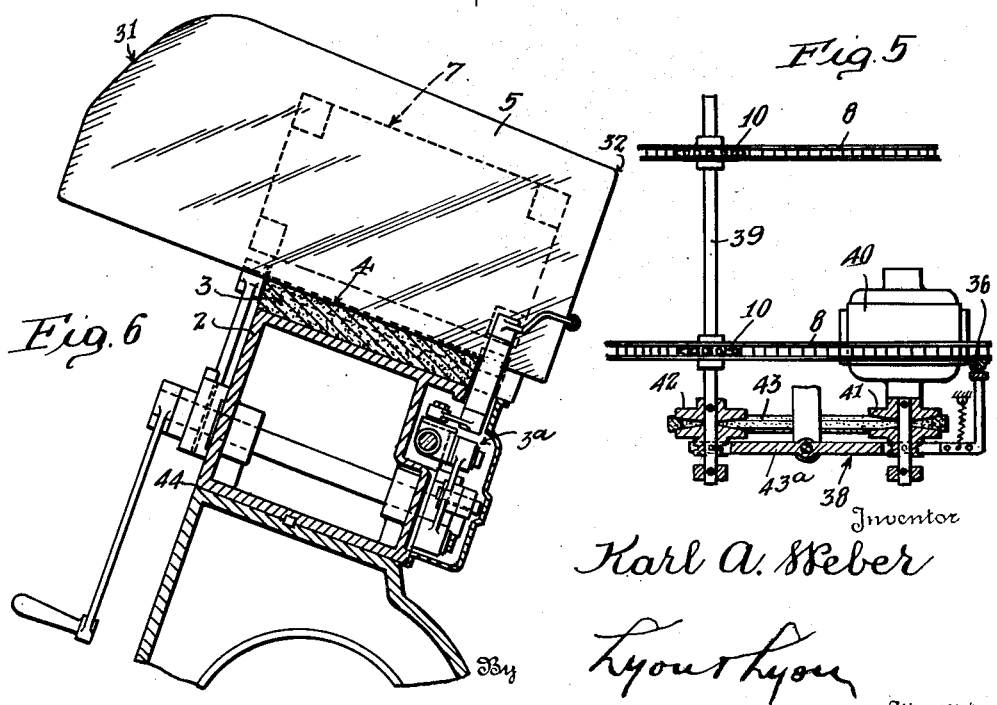
Inventor
Karl A. Weber
By Lyon & Lyon
Attorneys Oct. 13, 1936.　　　K. A. WEBER　　　2,057,174
GLASS GRINDING MACHINE
Filed Nov. 6, 1934　　　2 Sheets-Sheet 2
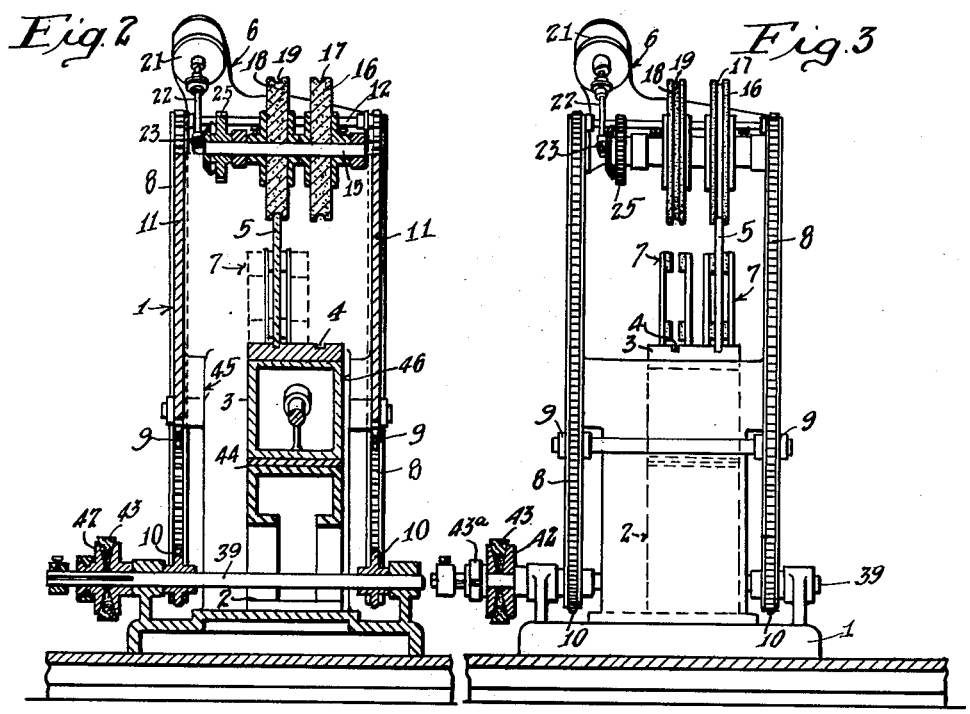
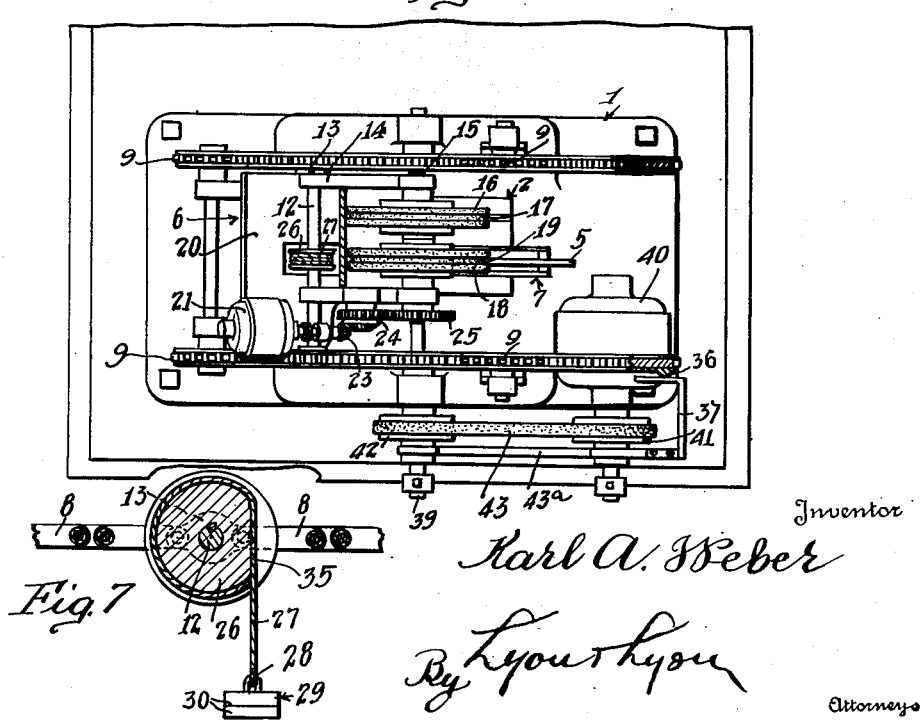

Patented Oct. 13, 1936

2,057,174

UNITED STATES PATENT OFFICE 2,057,174

GLASS GRINDING MACHINE

Karl A. Weber, Los Angeles, Calif.

Application November 6, 1934, Serial No. 751,730

17 Claims. (Cl. 51—34)

The invention relates to a glass grinding machine, and more particularly to a machine for grinding or finishing the edges of curved plates of glass such as are, for example, used in the construction of windows, wind-shields and the like in the construction of motor vehicle bodies.

While this invention is particularly adapted for use in connection with the finishing of the edges of plates of glass for use as wind-shields of plate glass for motor vehicle bodies, it is not contemplated that this invention is limited in scope to the above uses and in the use of the term "glass" as herein utilized, it is contemplated that the glass may include plate glass, other forms of glass, marble and other similar materials.

In the grinding of the edges of plates of glass such, for example, as disclosed in the Letters Patent issued to me February 9, 1926, No. 1,571,985, have proved effective. In use these machines are limited to the treatment of a single edge and their use on glass having curved edges is somewhat limited.

It is an object of this invention to provide a means for the economic treatment of edges of plates of glass in which means more than one edge of a plate of glass may be treated without the repositioning, or changing the position, of the plate of glass.

Another object of this invention is to provide a machine for treating the edges of glass having curved or straight edges, in which machine the edges, curved portions, or corners thereof, may be finished uniformly.

Another object of this invention is to provide a machine for the treatment of the edges of glass in which there is provided a grinding unit which is supported in such a manner as to move to or away from the edge of the glass, and wherein the pivotal support of the grinding means is in relation to the glass so positioned as to enable the maintenance of substantially the same grinding contact between the grinding wheel and the plate of glass.

Another object of this invention is to provide a machine for grinding the edges of plates of glass wherein there is provided a means for supporting a plate of glass, a means for grinding the edge of the plate of glass, means for effecting a relative movement between the plate of glass and the grinding means, and means whereby the rate of relative movement between the grinding means and the plate of glass may be varied at points of different contour of the edges of the plate of glass as desired or required to maintain a uniform treatment of the edge of the plate of glass at curved portions of the edge or the corners as desired.

Another object of this invention is to provide a glass grinding machine in which there is provided a means for grinding the edge of the plate of glass, and means for effecting a relative movement between the grinding means and the edge of the plate of glass, and in which machine there is provided a means for maintaining a relatively uniform ratio of return of travel and pressure between the grinding means and the plate of glass at points of different contour of the edge of the plate of glass.

Another object is to provide a machine for the treatment of the curved edge of a plate of glass which includes a means for supporting the plates of glass and an edge treating unit applicable to treat the edges of the plates of glass to preliminarily grind the glass upon one direction of relative movement between the plate of glass and the edge treating means, and a means to finish the edges of the plates of glass upon the relative return movement between the treating means and the plate of glass.

Other objects and advantages of this invention it is believed will be apparent from the following detailed description of a preferred embodiment thereof as illustrated in the accompanying drawings.

In the drawings:

Figure 1 is a side elevation diagrammatic in character of an edge-treating machine embodying my invention illustrating the same as utilized in connection with the treatment of a plate of glass having a curved edge.

Figure 2 is a sectional end elevation thereof taken substantially on the line 2—2 of Figure 1.

Figure 3 is an end elevation thereof.

Figure 4 is a plane view thereof.

Figure 5 is a detached fragmental view illustrating a form of change speed mechanism applicable for the purpose of varying the rate of travel of the edging unit as the same passes around portions of different curvature at the edge of the plate of glass.

Figure 6 is a diagrammatic view illustrating a means for shifting the glass support from contact with the grinding and finishing wheels or vice versa.

Figure 7 is a fragmental sectional view taken substantially on the line 7—7 of Figure 4.

In the preferred embodiment of my invention as illustrated in the accompanying drawings, I indicates a frame upon which there is mounted a support 2, including a bed plate 3, having a grooved mat 4 upon its upper surface into the grooves of which the edges of the plate 5 of glass is adapted to be positioned. It is obvious that the machine as embodying my invention may be made in multiple to permit of the simultaneous treatment of the edges of a multiplicity of plates of glass. Only one such unit is herein illustrated and described.

In order to hold the plate of glass 5 in position, clamping means 7 of any suitable or desirable form is provided for the purpose of maintaining the plate of glass 5 in substantially vertical position upon the support 2. Mounted upon opposite sides of the frame 1 is a pair of chains 8 which pass over idler sprockets 9 and driven sprockets 10. Chains 8 are guided by spaced tracks 11. Mounted with reference to the spaced chain conveyors 8 so that upon driving of the chains 8 it will move with the chain 8, is an edging unit 6. The edging unit 6 includes a shaft 12 which is pivotally supported in brackets 13 carried by the opposed chains 8. Secured to the shaft 12 are supporting arms 14 within the outer ends of which a wheel carrying shaft 15 is journaled. Mounted upon the wheel carrying shaft 15 is a grinding wheel 16 having a peripheral groove 17. Likewise mounted upon the shaft 15 to be driven thereby may be a finishing wheel 18 likewise having a peripheral groove 19 into which grooves 17 and 19 the edges of plates of glass 5 are received.

Supported on the rearward extension 20 of one of the arms 14 is a motor 21, which is provided for the purpose of driving the wheel shaft 15.

A shaft 22 of the motor drives through the pinions 23 and pinion 24 which is enmeshed with a pinion 25 secured to the shaft 15. The motor 21 being located on one side of the shaft 12 and the grinding wheels 16 and 18 being located on the opposite side of the shaft 12, tend to counterbalance each other so that the edge treating unit 6 is substantially a balanced unit.

In order to maintain the grinding pressure between the wheels 16 or 18 and the edge of the plate of glass 5, and to enable this grinding pressure to be regulated as required, I prefer to mount upon the shaft 12 a pulley 26 upon which a cable 27 is wound and secured. The free end 28 of the cable 27 carries a pressure regulating weight 29 which may, as indicated, be formed of a plurality of weight members 30 by the addition or removal of which weights 30 the pressure may be regulated as desired. The weights 29 are hung from the pulley 26 in such a manner as to overbalance the unit 6 in a direction to cause the grinding pressure to be set up between the grinding wheels and the edge of the glass, which is substantially constant irrespective of the position of rotation of the treating unit 6 around the shaft 12.

It will be obvious from the consideration of the drawings accompanying this application, that if the chains 8 are driven at a constant rate that the rate of progression of the grinding wheels 16 or 18 along the edge of the plate of glass 5 will vary as the grinding wheel passes over the curved portion 31 of the plate 5, or passes around the corner 32 of the plate 5, and likewise as the grinding wheels 16 or 18 pass through different portions of their travel due to the particular formation and curvature of the track 12ª.

In order to maintain a substantially uniform grinding pressure between the grinding wheels 16 and 18 and the edge of the plate of glass 5 with a constant weight 29 on the cable 27, it is essential to form the track 12ª in such a manner that the point of contact C of the grinding wheels 16 or 18 with the edge of the plate of glass will remain constant.

In order to accomplish this result, it will be necessary to change the contour of the direction of travel of the track 12ª for each plate of glass 5 of different curvature. As, however, the grinding machine embodying my invention are particularly adapted for the purpose of taking care of the productions of large quantities of similar plates of glass 5, all of which have substantially the same curvature such, for example, as the edge treating of plates of glass for use as automobile windshields, door windows, and the like, it will be obvious that when once set up to the right position the machine may be used for a long period of time without requiring any change or adjustment. In order, however, to avoid the necessity of curving the track 12ª at such points as 33, where the upper pulley 9 is employed as illustrated in Figure 1, I have found that the track may be maintained straight and follow the line indicated by the dotted lines 34 by making a compensation in the pulley 26 to slightly change the pressure between the grinding wheels 16 or 18 and the edge of the plate of glass for such slight variations in pressure as would be occasioned by maintaining the track 12ª straight at the point 33.

In order to accomplish this result, I have found that the upper pulley 9, as viewed in Figure 1, may be eliminated and the track 12ª maintained straight to follow the line of the dotted lines 34 by cutting out the pulley at the cut-out indicated at 35 in Figure 7, so that the grinding pressure will be compensated to take care of the transition of the point C of contact between the grinding wheels 16 and 18 and the edge of the plate of glass 5. In this way the pressure is maintained substantially constant, even though the track 12ª be slightly out of position to properly maintain the point of contact C constant throughout the travel of the edging unit 6.

As it is obvious that the grinding wheels 18 will not move over the edge of the plate of glass 5 in uniform rate when the edging unit is passing around the corners of the track, or the corners of the plate of glass 32, or curved portions 31 thereof, it is essential, in accordance with my invention, that means be provided for varying the rate of travel of the treating unit 6 in such a manner as to maintain a practically constant rate of movement of the point C of contact between the grinding wheel 18 and the edge of the plate of glass 5 throughout the travel of the edging unit 6.

In order to accomplish this result, I prefer to mount cam lugs 36 on one of the chains 8 in position to engage a lever 37, which lever 37 is the actuating lever of a change speed transmission mechanism 38. In this manner, speed of movement of the conveyors 8 may be regulated to compensate for the movement of the edging unit 6 around the points of curvature 31 or corners 32 of the plate of glass 5.

The driven sprockets 10 which drive the chains 8 are secured to a driven shaft 39, which driven shaft 39 is driven through the change speed transmission mechanism 38 from a variable speed motor 40.

The particular change speed transmission mechanism illustrated particularly in Figure 5 is only one of many such change speed transmissions which might be employed, and my invention is not limited to the use of any particular change speed transmission mechanism. The particular change speed transmission is of the type employed in variable V-grooved pulleys 41 and 42 connected together by a V-belt 43, and one half of each of these V pulleys 41 and 42 is connected through a rock lever 43ᵃ in such a manner that on manipulation of the rock lever 43ᵃ through the actuating lever 37, the belt pulley changes its position upon the pulleys 41 and 42 to increase or decrease the speed of drive of the shaft 39 and hence the speed of drive of the chains 8. This is a well known type of change speed transmission and it is not deemed essential that applicant specifically point out and describe in detail its construction and mode of operation.

The result accomplished is that throughout the edges, corners and curved portions of the plate of glass 5 the rate of travel of the point C of contact between the grinding wheels and the edge of the plate of glass may be maintained relatively uniform, thereby insuring a uniform treatment of the edges of the plate of glass.

The motor 40 is of the reversible type so that in the construction as herein illustrated after the grinding unit has ground the edge of the plate of glass, the direction of travel of the chains 8 may be reversed and during the reverse travel, the finishing wheel 18 may be shifted into position with relation to the edge of the plate of glass 5 just ground so that upon the return travel the edge will be finished.

In order to accomplish this result, the bed plate 3 upon which the plate of glass 5 is supported may be shifted transversely of the direction of travel of the edge-treating unit 6. The bed plate 3 is preferably mounted in slides 44 and is adapted to be moved transversely between the stops 45 and 46 and clamped in its respective position by the clamp means 3ᵃ so that the edges of the plates of glass 5 will be accurately aligned with the grooves 17 and 19 of the grinding and finishing wheels 16 and 18 respectively.

Having fully described my invention, it is to be understood that I do not wish to be limited to the details herein set forth, but my invention is of the full scope of the appended claims.

I claim:

1. In a glass grinding machine, means for supporting a plate of glass, means for grinding the edge of the plate of glass, means for effecting a relatively uniform rate of travel between the edge of the plate of glass and the grinding means at points of different contour of the edge of the plate of glass.

2. In a glass grinding machine, means for supporting a plate of glass, a grinding wheel adapted to contact the edge of the plate of glass, means for maintaining a grinding pressure between the grinding wheel and the edge of the plate of glass, and means for maintaining a relative uniform ratio of rate of travel and pressure between the edge of the plate of glass and the grinding means at points of different contour of the edge of the plate of glass.

3. In a glass grinding machine, means for supporting a plate of glass, means for grinding the edge of the plate of glass including the corners or portions of curvature of the edge of the plate of glass including a grinding means, means for maintaining a grinding contact between the grinding means and the edge of the plate of glass, means for effecting a relative travel between the grinding means and the edge of the plate of glass, and means for maintaining a relatively uniform rate of travel of the grinding means with reference to the edge of the plate of glass at points of different contour of the edge of the plate of glass.

4. In a glass grinding machine, means for supporting a plate of glass, means for grinding the edge of the plate of glass including the corners or portions of curvature of the edge of the plate of glass, including a grinding wheel, means for maintaining a pressure contact between the grinding wheel and the edge of the plate of glass, means for effecting a relative travel between the grinding means and the edge of the plate of glass, and means for maintaining a substantially uniform ratio of pressure to relative rate of travel between the edge of the plate of glass and the grinding means throughout the portions of different curvature of the edge of the plate of glass.

5. In a glass grinding machine, means for supporting the plate of glass, a grinding wheel, means for effecting a relative movement between the grinding wheel and a plate of glass, and means for varying the rate of movement of the grinding wheel and the plate of glass so as to effect a relative constant rate of travel of the point of contact between the grinding wheel and the edge of the plate of glass throughout points of different curvature of the edge of the plate of glass.

6. In a glass grinding machine, means for supporting a plate of glass, a grinding wheel, means for effecting a relative movement between the grinding wheel and the edge of the plate of glass, means for varying the rate of relative movement of the grinding wheel and the plate of glass so as to effect a substantially constant ratio of speed of travel and pressure of contact between the grinding wheel and the edge of the plate of glass.

7. In a glass grinding machine, the combination of a support upon which a plate of glass having a curved edge is adapted to be supported and held in substantially vertical position, a curved track, an edging unit for treating the curved edge of the glass, including an edging wheel, means for moving the edging unit along the track with the edging wheel in contact with the curved edge of the plate of glass, and means for varying the rate of movement of the edging unit as it travels along the curved portion of the edge of the plate of glass.

8. In a glass grinding machine, the combination of a support upon which a plate of glass is adapted to be supported and held in substantially vertical position, a track, a glass edging unit for treating the edge of a plate of glass including an edging wheel, means for moving the edging unit along the track with the edging wheel in contact with the curved edge of the plate of glass, means for driving the edging wheel, and means operatively connecting the edging wheel and the driving means, said driving means being arranged to act as a counterbalance for the edging wheel.

9. In a glass grinding machine, the combination of a support upon which a plate of glass having a curved edge is adapted to be supported and held in substantially vertical position, a track, an edging unit including an edging means, means for moving the edging unit along the track with the edging means in contact with the edge of a plate of glass, said edging unit including means for counterbalancing the edging means, means for controlling the grinding pressure between the edging means and the edge of the plate of glass, and means for varying the rate of movement of the edging unit along the track as the edging unit travels from the straight to the curved portions of the edge of the plate of glass.

10. In a glass grinding machine, the combination of a support upon which a plate of glass having a curved edge is adapted to be supported and held in substantially vertical position, a track, an edging unit, means for pivotally mounting the edging unit relative to the track, means for conveying the edging unit along the track, the edging unit including an edging wheel carried on an arm extended from the pivotal support of the edging unit with reference to the track, and means carried by another arm extending from said pivotal support for counterbalancing the edging wheel so that the grinding pressure between the edging wheel and the edge of the plate of glass may be determined.

11. In a glass grinding machine, the combination of a support upon which a plate of glass having a curved edge is adapted to be supported and held in substantially vertical position, a track, an edging unit including a grinding wheel and a finishing wheel, means for moving the edging unit along the track with the grinding wheel in contact with the edge of the plate of glass, means for relatively shifting the edging unit and the support for the plate of glass to move the finishing unit in contact with the plate of glass, and means for returning the edging unit so that upon the return movement of the edging unit the previously ground edge of the plate of glass is finished.

12. In a glass grinding machine, means for supporting a plate of glass, a grinding wheel for grinding the edge of the plate of glass, means for effecting relative movement between the edge of the plate of glass and the grinding wheel, and means for varying the rate of relative movement of the grinding wheel and plate of glass so as to vary the quality of work and amount of glass ground at any predetermined point.

13. In a glass grinding machine, means for supporting a plate of glass in position to make accessible for treatment three of its edges, a grinding wheel, means for rotating the grinding wheel, means for maintaining a substantially uniform pressure between the grinding wheel and the edge of the plate of glass, means for effecting a continuous relative movement between the grinding wheel and the edge of the plate of glass to grind the three accessible edges of the plate of glass, and means for maintaining a relatively uniform speed of travel between the grinding wheel and the edge of the plate of glass.

14. In a glass grinding machine for grinding the edges of a plate of glass, the edges of which plate of glass are of different curvature, means for supporting the plate of glass, means for grinding the edges of the plate of glass, means for driving the grinding means, means for effecting a relative movement between the plate of glass and the edge grinding means so that in a single operation a plurality of the edges of the plate of glass are ground, means for driving the latter said means and one of said drive means including a variable change speed drive adapted to vary the rate of drive of one of said driving means at points of different curvature of the edges thereof to maintain a substantially uniform glass grinding rate at the portions of different curvature of the edges of the glass.

15. In a glass grinding machine for grinding the edges of a plate of glass, the edges of which plate of glass are of different curvature, means for supporting the plate of glass, means for grinding the edges of the plate of glass, means for driving the grinding means, means for effecting a relative movement between the plate of glass and the edge grinding means so that in a single operation a plurality of the edges of the plate of glass are ground, means for driving the latter said means and one of said drive means including a variable change speed drive adapted to vary the rate of drive of one of said driving means at points of different curvature of the edges thereof to maintain a substantially uniform glass grinding rate at the portions of different curvature of the edges of the glass, and means engageable during the relative movement of the plate of glass and the grinding means to actuate the variable change speed drive to change the speed of drive thereof for succeeding edge grinding.

16. In a grinding machine for grinding the curved edges of glass plates, means for supporting the plate of glass, a grinding means, means for driving the grinding means, driving means for effecting a relative movement of the glass plate and the grinding means so that a plurality of the edges of the plate of glass may be ground in a single continuous operation by a single grinding means, a variable speed change drive means connected in one of said drive means, and means engageable at points of different curvature of the plate of glass to actuate the variable change speed drive means to change the speed of operation of said drive means.

17. In a grinding machine for grinding the curved edges of plates of glass, a support for a plate of glass, a grinding wheel, means for driving the grinding wheel, a drive means for effecting a relative movement between the plate of glass and the grinding wheel so that the grinding wheel in a single continuous operation may grind portions of the plate of glass of different curvature, a variable change speed drive means connected in the said drive means, and means operable at points of different curvature of the edge of the plate of glass to actuate the variable change speed drive means to change the speed of relative movement of the plate of glass and the grinding wheel.

KARL A. WEBER.